J. R. BECKETT.

Assignor, by mesne assignments, to himself, C. B. PAYSON, D. N. PAYSON, and S. S. ROWE.

Street Railway.

No. 8,125. Reissued March 19, 1878.

WITNESSES

F. F. Raymond 2d

A. J. Oettinger.

John R. Beckett

INVENTOR.

by his Atty.

Thos. Wm. Vernier

N. PETERS, PHOTO-LITHOGRAPHER, WASHINGTON, D. C.

UNITED STATES PATENT OFFICE.

JOHN R. BECKETT, OF CUSHING, MAINE, ASSIGNOR, BY MESNE ASSIGNMENTS, TO HIMSELF, CALVIN B. PAYSON, DARIUS N. PAYSON, AND SOLOMON S. ROWE.

IMPROVEMENT IN STREET-RAILWAYS.

Specification forming part of Letters Patent No. 142,668, dated September 9, 1873; Reissue No. 8,125, dated March 19, 1878; application filed October 4, 1877.

*To all whom it may concern:*

Be it known that I, JOHN R. BECKETT, of Cushing, in the county of Knox and State of Maine, have invented an Improvement in Street-Railways, of which the following is a full, clear, and exact description, reference being had to the accompanying drawing, making part of this specification, in which—

Figure 1:
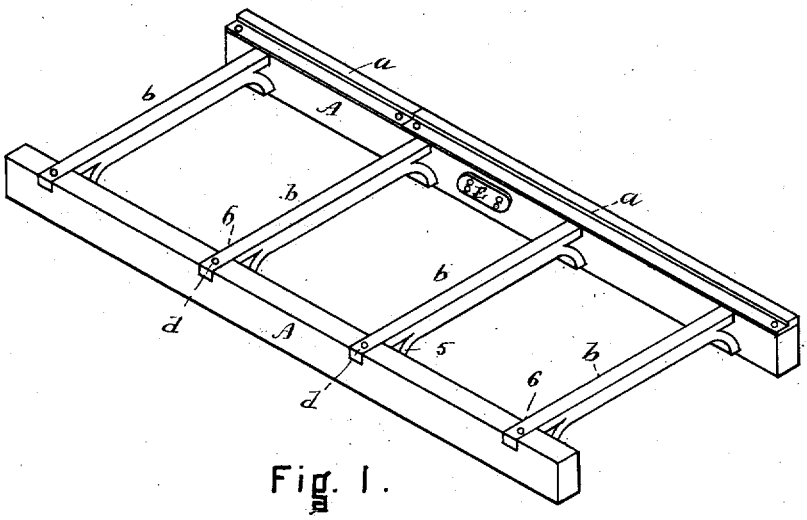
Figure 2:
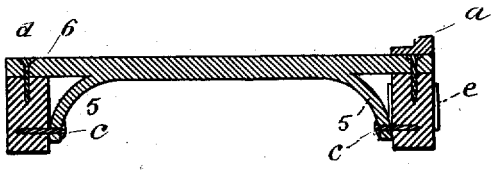

Figure 1 is a perspective view of a portion of the road-bed of a street-railway constructed in accordance with my invention, and Fig. 2 is a transverse section through the same.

Road-beds for street-railways as now constructed consist of longitudinal wooden stringers resting upon transverse wooden sleepers or ties, to which they are secured by angle-braces, bolted to the sleepers and stringers on each side of the latter, the whole being placed so that the upper surface of the rails which are bolted onto the stringers will be on a level with the top of the surrounding pavement. The stringers, being merely confined near the bottom by the braces, which extend up a short distance only, are, however, liable to be rocked in or spread apart by the passage over them of cars or heavy wagons; and this change of gage of the tracks creates serious difficulties, as it often causes derailment of cars, and necessitates taking up the street in order to replace the stringers and secure them in position.

To place the sleepers in position it is necessary to dig much deeper than is practiced with my improvement, and the displacement of the surface of the street is, when sleepers and stringers are used, irregular in depth, and always in the place where the sleepers are, and usually along all parts of the track, wider than when my improvement is used.

When my improvement is used the width of surface disturbance is determined absolutely and evenly by the gage of the track, and is only a few inches wider than is required in a finished track, because with this improvement the rails of the track are held together and kept apart by its organization. This includes a cross-tie and brace, located principally or wholly between the pairs of stringers which constitute the foundation of the permanent way, and ties them together and presses them apart, at or near their tops, immediately below the rails.

My invention has for its object to dispense with the transverse wooden sleepers, and greatly reduce the number of spikes required to secure the stringers in place, thus effecting an important saving in the cost of constructing the road-bed, giving better results than have heretofore been attained in preserving the integrity of the gage of the track. It consists in a road-bed for street-railways composed of longitudinal stringers and transverse metallic ties or braces, which are securely fastened to the stringers at or near their upper surfaces, and which are provided with a projection or arm, abutting against or fastened to the stringers and keeping them apart. I prefer that this projection, which holds the stringers apart, shall be in the form of a branch or bifurcation of the brace, extending from the brace toward the bottom of the stringer, and there abutting against and spiked to it, so as to tie the stringers together at the top and bottom, as well as to tie them together and hold them apart, and it is this construction that I shall describe, and have illustrated in the drawing, to enable those skilled in the art to understand and use my invention.

A A represent the longitudinal wooden stringers, on which the rails *a* are laid. These stringers rest directly on the earth, which is excavated to receive them at such a depth that the rails, when secured upon the stringers, will lie flush with, or nearly flush with, the top of the pavement. Wrought-iron braces *b b* extend between the stringers A A, and are secured thereto at a considerable distance apart—say, from five to seven feet.

Each of the braces *b b* is bifurcated at each end, the lower branch 5 being curved downward, and extending to, or nearly to, the bottom of the stringer, where it is abutted against the stringer, and is securely fastened by a spike or bolt, *c*, driven into the inner side of the stringer, while the upper end 6 of the brace is made to fit flush with or a little below the upper surface of the stringer, where it is held by a spike or bolt, *d*, the head of which is countersunk flush with the upper surface of the brace, which is intended to lie about an inch and a half below the upper surface of the pavement and to be covered with gravel.

The stringers A A are thus held rigidly by the braces *b* together at the top, and are also held apart at the proper gage by a projection or arm, 5, which abuts against the inner side of each stringer. From the fact that this projection or arm 5 is spiked to the stringer the track is held together at the bottom, as well as kept apart, by the aid of the abutments furnished by projection or arm 5.

Any strain which may tend to spread the stringers apart being brought upon the bolts *d* in a direction at right angles to their length, there is no liability of these bolts being drawn or loosened, as is the case with bolts used to fasten the angle-braces heretofore employed at the joint between the stringers and sleepers. Furthermore, only four spikes are required for each of the braces *b*, while twelve spikes are required to secure the four angle-braces heretofore employed to fasten together the stringers and transverse wooden sleepers. I also dispense with the sleepers and angle-braces, and save the labor of setting the sleepers in the ground. I thus am enabled to make a considerable saving in the cost of constructing a road-bed, while rendering it stronger and more durable than heretofore, with less liability of derangement of the gage, and the consequent disasters arising from this cause.

The contiguous ends of the stringers A A are held together by the joint-plates or fishes *e*, bolted on each side, care being taken that the joints in the opposite stringers shall break joints with each other.

What I claim as my invention, and desire to secure by Letters Patent, is—

1. The within-described road-bed for street-railways, consisting of the longitudinal stringers A A, united by bifurcated metallic braces *b*, extending transversely between them, substantially in the manner and for the purpose described.

2. In a road-bed for street-railways, the braces *b*, securely fastened to each of the stringers at or near its top, and provided with a projection or arm, 5, upon the inside of each of the stringers A A abutted against them, substantially as described.

3. In a road-bed for street-railways, the combination of a metallic brace, having a projection or arm, 6, which lays hold of the body of the stringers upon their upper side and prevents them from spreading apart, and another projection or arm, 5, which abuts against the stringers and prevents them from approaching each other, with the stringers A A, substantially as described.

4. The combination, below the surface of the street, for the substructure of a street-railway, of stringers A A and horizontal metallic braces extended transversely between them, and having abutments bearing against the said stringers near their base, and provided with projections or arms 6, extended into the body of the stringers near their upper side, all combined substantially as shown and described, and for the purpose stated.

5. The combination of the stringers A A, the horizontal metallic transverse braces located in line with the top of said stringers just below the rails, and then spiked to said stringers, substantially as and for the purpose described.

6. In a road-bed for street-railways, the combination of the sleepers A A with each other at a permanent gage by means of the transverse metallic brace extended horizontally between them, in line with the upper portion of said stringers, and securely confined to said stringers at or near the base of the rail laid upon said stringers, and below the surface of the street-pavement, and provided with an abutment bearing on the inside of each stringer below its median line, substantially as described.

7. In a road-bed for street-railways, a horizontal metallic brace, extended transversely between the stringers A A above their median line, and laying hold of said stringers above their median line, said brace being located below the surface of the pavement, and having abutments against said stringers below the median line of said stringers, substantially as described.

JOHN R. BECKETT.

Witnesses:
JAMES R. MALCOLM,
R. B. FREEMAN.